(12) United States Patent
Folk et al.

(10) Patent No.: US 8,517,257 B1
(45) Date of Patent: Aug. 27, 2013

(54) COERCED ROBBERY PREVENTION IN A CASH HANDLING DEVICE

(75) Inventors: Amy Baker Folk, Charlotte, NC (US); William Thomas Sanders, Denver, NC (US); Daniel Christopher Bohen, Charlotte, NC (US); Veralyn Dee Hensley, Folsom, CA (US); Shane Anthony Johnson, Charlotte, NC (US); Paul Martin Mattison, Sherrills Ford, NC (US)

(73) Assignee: Bank of America Corporation, Charlotte, NC (US)

( * ) Notice: Subject to any disclaimer, the term of this patent is extended or adjusted under 35 U.S.C. 154(b) by 677 days.

(21) Appl. No.: 12/212,450

(22) Filed: Sep. 17, 2008

(51) Int. Cl.
*G06Q 40/00* (2012.01)
*G06F 7/04* (2006.01)

(52) U.S. Cl.
USPC .......................................... 235/379; 726/19

(58) Field of Classification Search
USPC ....................................................... 235/379
See application file for complete search history.

(56) References Cited

U.S. PATENT DOCUMENTS

| | | | | |
|---|---|---|---|---|
| 5,615,277 | A * | 3/1997 | Hoffman | 382/115 |
| 5,731,575 | A | 3/1998 | Zingher et al. | |
| 6,679,422 | B2 * | 1/2004 | Brown et al. | 235/379 |
| 6,871,288 | B2 * | 3/2005 | Russikoff | 726/19 |
| 7,004,387 | B1 | 2/2006 | Kaimikaua et al. | |
| 7,191,950 | B1 * | 3/2007 | Petrovich et al. | 235/472.02 |
| 7,600,676 | B1 * | 10/2009 | Rados et al. | 235/380 |
| 2002/0170954 | A1 | 11/2002 | Zingher et al. | |
| 2008/0109356 | A1 * | 5/2008 | Sutton et al. | 705/44 |

\* cited by examiner

*Primary Examiner* — Thien M Le
*Assistant Examiner* — Toan Ly
(74) *Attorney, Agent, or Firm* — Banner & Witcoff, Ltd.; Michael A. Springs

(57) ABSTRACT

Methods and devices provide robbery functionality in a cash handling device. A user attempting to withdraw money from a recycler may be identified. The user may indicate a problem, such as a robbery attempt. An alarm code may be sent from the recycler and may provide notification of the robbery attempt. A normal welcome screen may be displayed to the user so that the robber is not alerted of the robbery notification. The user may request a withdrawal of money and may identify a quantity of money to be withdrawn. Money may be dispensed if the withdrawal request is less than a robbery limit. If the request exceeds the limit, options may include: notice that a limit has been exceeded or that the requested funds are unavailable, dispensing amount(s) up to the robbery limit, and/or displaying error message(s). The machine may be precluded from use until the out of service condition is reset.

13 Claims, 11 Drawing Sheets

LIMITS BY ENTITLEMENT ROLE

PLEASE CHANGE ONE OR MORE OF THE OPTIONS BELOW AND PRESS OK TO CONTINUE

| | CASHIERS | SUPERVISORS | MANAGERS |
|---|---|---|---|
| TRANSACTION LIMIT IN USD: | $200 | $200 | 1000 |
| DAILY LIMIT IN USD: | $2,000 | $2,000 | $10,000 |

RECYCLER WITHDRAWAL LIMIT: $1,000

FIG. 7A

COERCED ROBBERY PREVENTION IN A CASH HANDLING DEVICE

BACKGROUND

Cash handling devices (e.g., currency recyclers, cash recyclers, automated teller machines, and the like) allow authorized users to withdraw money. In some situations, an authorized user may be under duress (e.g., in a robbery) and may be forced to approach a cash handling device and withdraw money. Currently, there is no way for the authorized user to notify the bank or the police of a problematic situation like this while at the cash handling device at the time of the transaction and thus to limit the amount of the robbery. Consequently, there is no current way for the cash handling device to take appropriate action(s) at the time of the transaction when presented with this type of problem.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In accordance with various embodiments of the present invention, methods and devices can provide robbery functionality in a cash handling device. A user attempting to withdraw money from a cash handling device may be identified. The user may indicate a problem, such as a robbery attempt. An alarm code may be sent from the cash handling device and may provide notification of the robbery attempt. A normal welcome screen may be displayed to the user so that the robber is not alerted of the robbery notification. The user may request a withdrawal of money and may identify a quantity of money to be withdrawn. Money may be dispensed if the withdrawal request is less than a robbery limit. If the request exceeds the limit, an error message, notice that the requested funds are unavailable, notice that a daily withdrawal limit has been exceeded, or other message may be displayed. In some embodiments, if the request exceeds the limit, options may include: notice that a limit has been exceeded or there are insufficient funds, and/or dispensing an amount such as, for example, up to the robbery limit, and then displaying an error message that the machine is out of service or out of funds. After which, the machine may optionally be precluded from use until the out of service condition is reset. In some embodiments, the reset may not occur a specific period of time has elapsed such as, for example, 30 minutes has elapsed. During this period of time, the false error screen may continue to be displayed.

In various embodiments, the identification of a user may be accomplished in a variety of ways such as, for example, by allowing entry of a user identification code, by swiping a magnetic strip code and entering a password or personal identification number (PIN), by a retinal or iris scan, by scanning a bar code and entering a password or PIN, by using an RFID tag or device, by using a proximity card and entering a password or PIN, by scanning the user's fingerprint or handprint, or by using any other type user identification system or methodology.

In a further embodiment, the identification of the user and the notification that a robbery attempt is in progress may be accomplished by allowing entry of a combination user identification code and robbery code. Alternatively, this may be accomplished by allowing one code to be entered before or after the other.

In yet another embodiment, the user may notify the cash handling device of a robbery by entering a robbery passcode.

In addition, the foregoing embodiments can be implemented in an apparatus that includes a processor for executing computer executable instructions, memory that stores the computer executable instructions, an input means for receiving user input, a display for displaying notifications and messages to the user, and a communication interface in order to communicate to a bank, an alarm monitoring company, a police station, or other location or entity. Each of the above-identified method steps can be implemented as computer-executable instructions that are stored in the memory and executed by the processor.

In still another embodiment, the cash handling device may be a cash recycler.

In another embodiment, an input means and display may include a touch sensitive screen.

In yet another embodiment, the input means may include a touch-sensitive screen.

In still another embodiment, the display may include a touch sensitive screen.

In other embodiments, the input means may include a keypad or keyboard.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

FIGS. 7A and 7B show sample graphical user interfaces allowing limits to be set by entitlement roll or as a robbery passcode limit.

DETAILED DESCRIPTION

In accordance with various aspects of the disclosure, systems and methods are illustrated for providing recycler robbery functionality.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
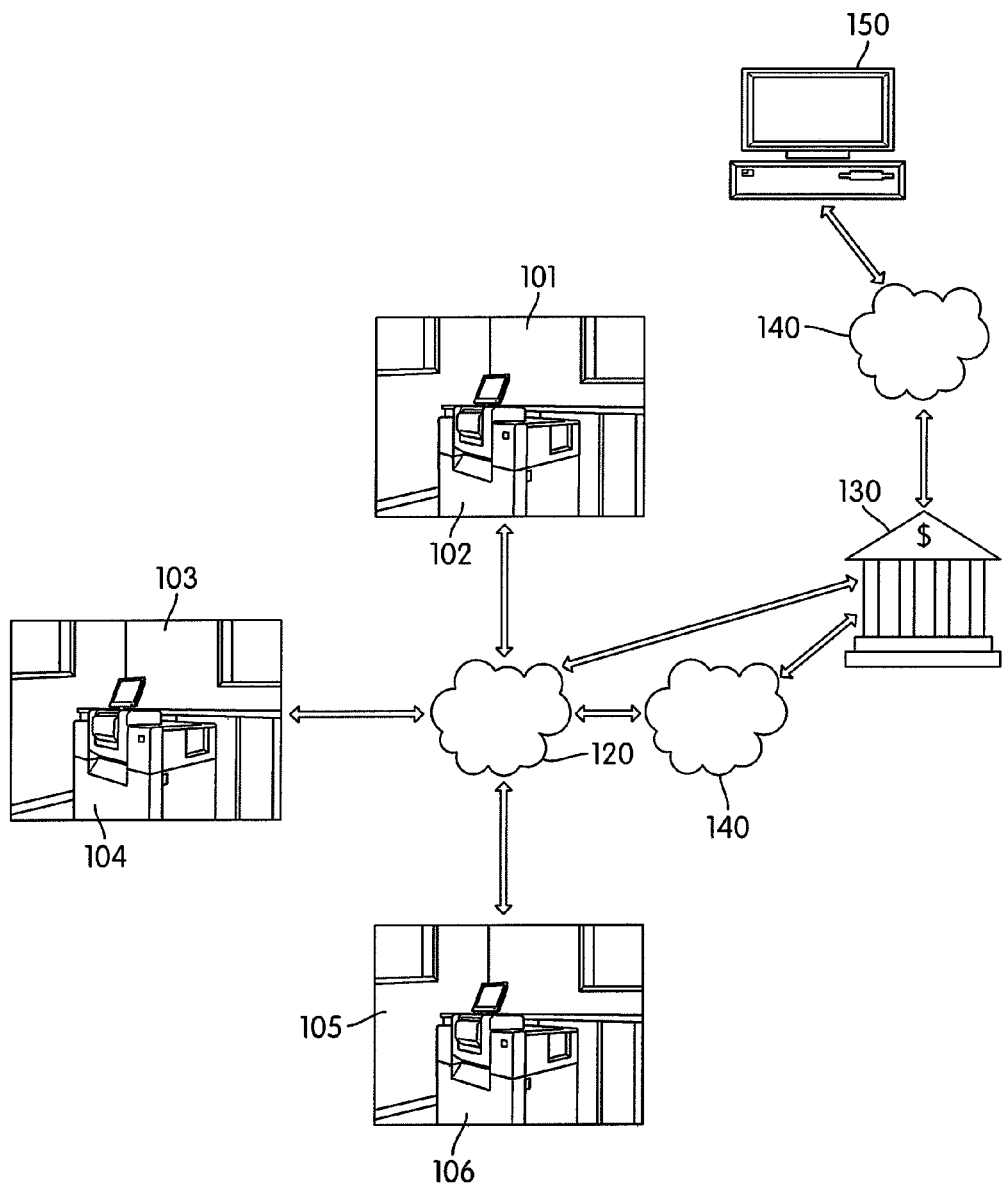
FIG. 1 illustrates an example of a suitable operating environment in which various aspects of the disclosure may be implemented.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 being connected to bank 130. According to one or more arrangements, bank 130 may utilize an infrastructure which includes a server 150 having components such as a memory, a processor, a display, and a communication interface.

Figure 2:
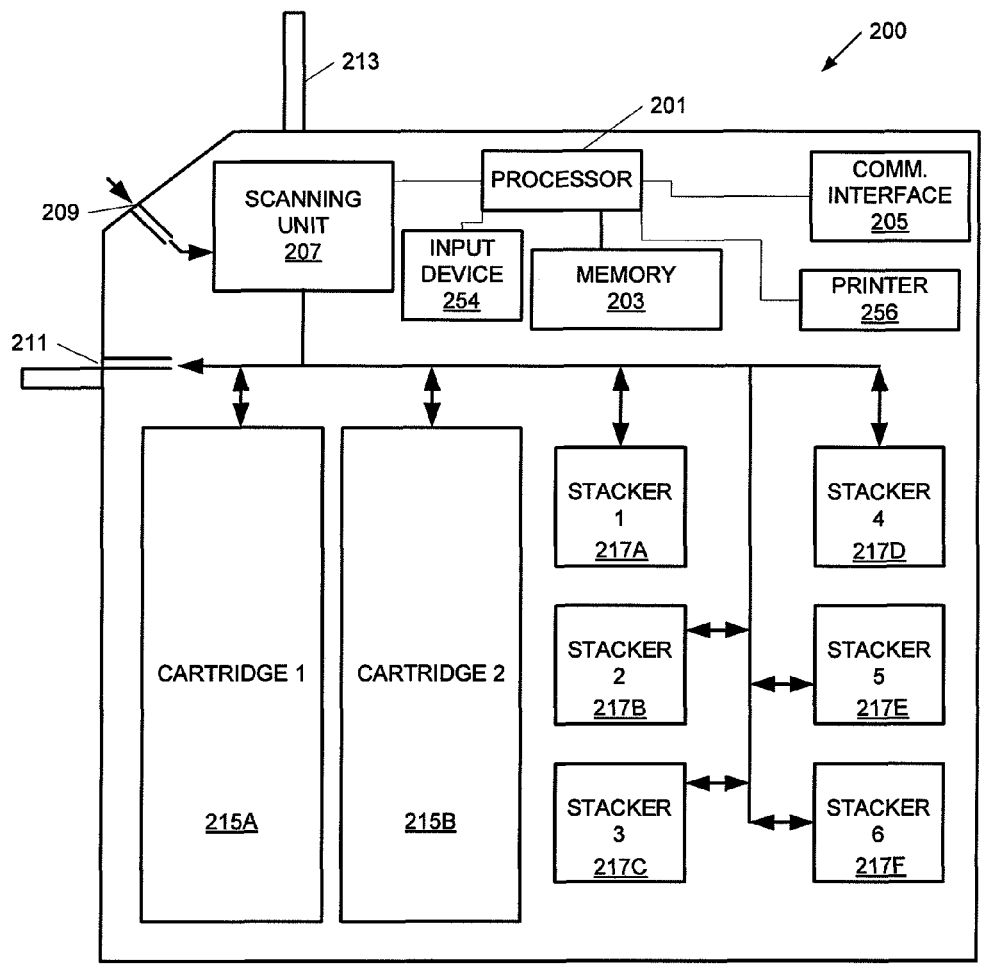
FIG. 2 illustrates a simplified diagram of a cash handling device in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and stackers 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, stackers 217 and cartridges 215 are configured to store currency. Currency may be inserted through input slot 209 and withdrawn through withdrawal slot 211. Stackers 217 may be used to store and organize currency based on denomination. For example, all $5 bills may be stored in stacker 2 (i.e., stacker 217B) while all $20 bills may be stored in stacker 3 (i.e., stacker 217C). Cartridges 215A and 215B, on the other hand, may be used to store overflow currency and/or currency for transport. Thus, if stackers 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and stackers 217 may further be removable for easier access or transport.

Scanning unit 207 may be configured to scan each bill or currency that is inserted into recycler 200. Scanning unit 207 may be configured to detect defects, invalid reproductions of currency, denomination, type of currency (e.g., which country the currency originates from) and the like. Scanning unit 207 may further be configured to refuse money (either through input slot 209 or withdrawal slot 211) if it cannot be properly recognized or if the currency is deemed to be an invalid reproduction. Scanning unit 207 may send such data to processor 201 which may, in turn, save the data in memory 203.

Further, recycler 200 may include one or more mechanical or electromechanical systems (not shown) for automatically transferring currency between stackers 217, cartridges 215, input slot 209 and withdrawal slot 211 in recycler 200. For example, currency may automatically be withdrawn from stackers 217 and directed into cartridge 215A for storage using a series of motorized rollers. In another example, currency stored in cartridge 215A may be withdrawn and organized and stored into stackers 217 according to denomination. Using such systems to facilitate the automated movement of currency between storage components and other portions of recycler 200 may provide efficiency and security by alleviating some of the need to manually handle currency stored within recycler 200.

Figure 3:
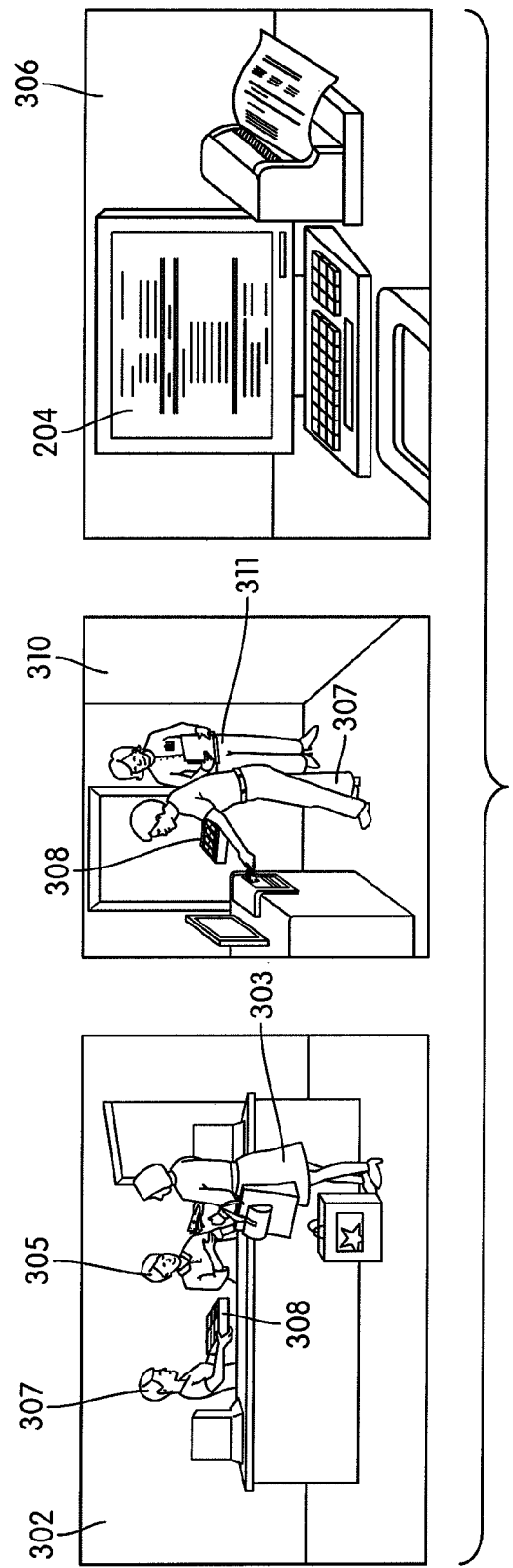
FIG. 3 illustrates various features of a cash handling device that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
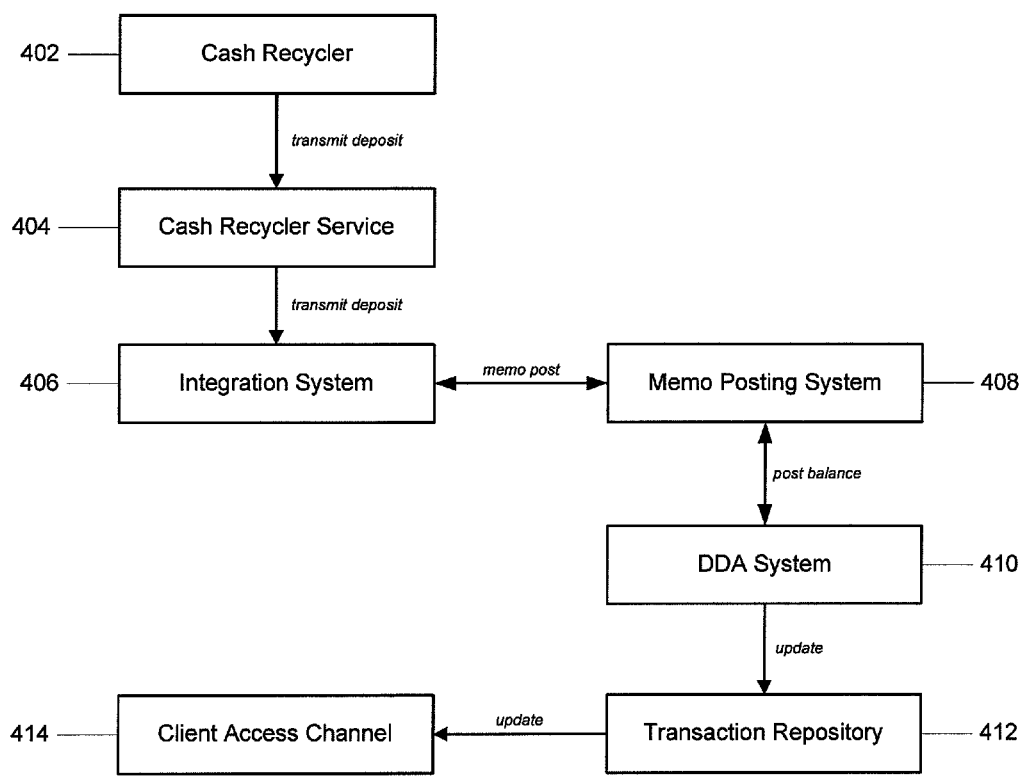
FIG. 4 illustrates a system configuration that may be used in accordance with an aspect of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

Figure 5:
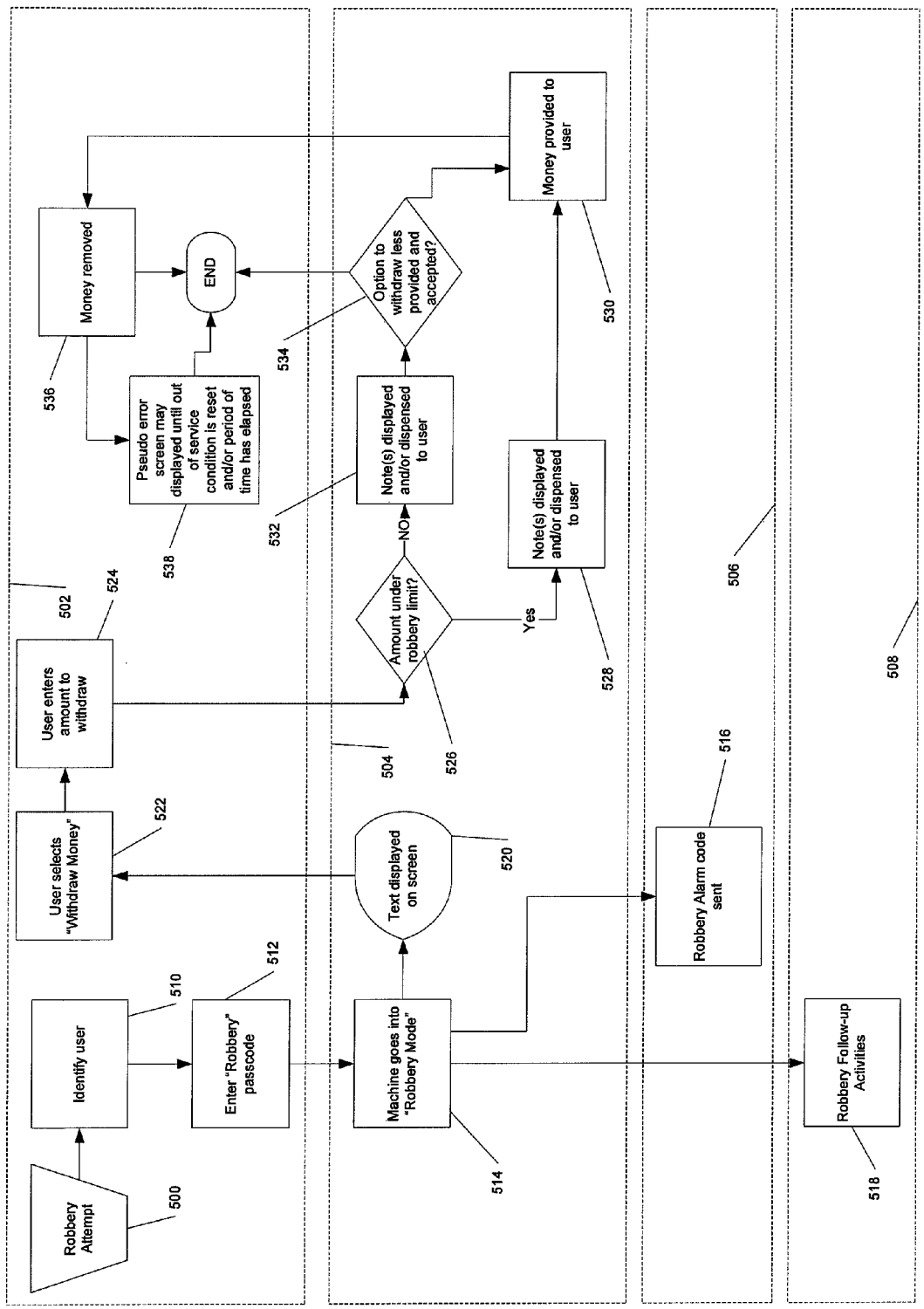
FIG. 5 illustrates an example method for implementing recycler robber functionality.

FIG. 5 illustrates an example method for implementing robber functionality in a cash handling device when a robbery attempt 500 or other duress induced situation is encountered. In FIG. 5, functionality that may be performed or steps that may be taken by a client or user is shown in box 502. Similarly, functionality that may be performed or steps that may be taken by a cash handling device is shown in box 504. Alarm connections and functionality are illustrated in box 506. Lastly, bank action is illustrated in box 508. In this example, FIG. 3 might illustrate a situation in which an authorized user 307 is being forced by a robber 310 to make a withdrawal.

First, the authorized user 307 is identified 510. This identification could be accomplished, for example, by the user entering a user identification code, swiping a magnetic strip code and entering a password or personal identification number (PIN), scanning a bar code and entering a password or PIN, using proximity card and entering a password or PIN, scanning the user's fingerprint or handprint, or using any other type user identification system or methodology.

A robbery passcode 512 can be entered by the user 307. This passcode 512 could be a separate code that is entered prior to user identification 510 or after user identification 510. In addition, the passcode 512 could be appended to the beginning of or end of entry of any type of user identification code, password, or PIN. Additionally, the passcode 512 could be inserted into the middle of entry of any type of user identification code, password, or PIN. The robbery passcode 512 could also be triggered by pressing certain key(s) or combinations thereof on a keypad or keyboard. The passcode 512 could also be triggered by pressing a certain portion of or icon on a touch sensitive display 204, 206, 208, 248. In various embodiments, this trigger functionality may be pre-programmed, programmable, static, or dynamic. The trigger may be remotely programmable by a bank or other authorized entity. In still another embodiment, a bank may allow appropriate personnel at the retailer to enable or disable this functionality and, if enabled, to program or select may constitute a trigger.

Different robbery passcodes may be used in order to indicate whether the robber is internal (e.g., an employee is the robber) or external (e.g., the robber is an unknown stranger).

After the robbery passcode 512 is entered or triggered, the cash handling device can enter a robbery mode 514. At this point, an alarm code or other notification may be sent 516 to a bank, alarm monitoring company, the police, or another entity 506 through a communication interface 232, 234, 236, 250. Robbery follow-up activities 518 may be performed at any time and may include, for example, implementing security protocols to protect people in the location, making account changes, issuing credits or debits, and/or notifications of reduced cash amounts in the recycler.

After the robbery passcode 512 is entered or triggered, an initial screen of text can be displayed 520 to the user 307. This initial screen 520 could be a normal welcome screen such that the robber would not be alerted that a robbery passcode 512 had been entered or that an alarm had been triggered. A normal welcome screen may include an interface that would be displayed if robbery functionality were not activated. Alternatively, the screen of text 520 could be a customized and streamlined screen specialized for this type of situation.

On this screen of text 520 or on a subsequent screen, the display could provide an option for allowing the user to withdraw money and the client could be allowed to make a selection to withdraw money 522. The user is then able to select or enter the amount of money to be withdrawn 524.

The cash handling device may optionally then compare the amount of the withdrawal request with a robbery limit 526, which may have been selected in advance. This robbery limit may be configurable or selectable. For example, a robbery limit may be defined based on a percentage (e.g., 5%, 25%, 100%) of total funds in the recycler, a percentage of funds in a client's account, an amount specified by the client, an amount specified by the financial institution, a size of the client and the like.

If the requested amount is less than the robbery limit, then note(s) may be displayed and/or dispensed to the user 528. These notes might include any type of standard notes or text provided to a user upon withdrawal. Either directly after determining whether the requested amount is less than the robbery limit 526 or after displaying/dispensing any applicable notes 528, money may be provided to the user 530 and may be removed 536.

If the requested amount is not less than the robbery limit, then note(s) may be displayed and/or dispensed to the user 532 in order to facilitate limiting the amount of the robbery or to prevent the robbery. These notes might indicate that a daily withdrawal limit has been exceeded, that the recycler is empty, or that there is a machine service error. Alternatively, the notes might indicate that the amount requested is not available and may provide an option to withdraw a lesser amount 534. If this option is enabled and is accepted by the user, then money would then be provided to the user 530 and could be removed 536.

In another embodiment, if the requested amount greater than the robbery limit, then money may be dispensed up to the robbery limit and then note(s) may be displayed and/or dispensed to the user 532 in order to facilitate limiting the amount of the robbery or to prevent the robbery. Again, these notes might indicate that a daily withdrawal limit has been exceeded, that the recycler is empty, or that there is a machine service error. In some embodiments, if the request exceeds the limit, options may include: notice that a limit has been exceeded or the requested funds are unavailable, and/or dispensing an amount such as, for example, up to the robbery limit, and then displaying an error message that the machine is out of service or out of funds. After which, the machine may optionally be precluded from use until the out of service condition is reset 538. In some embodiments, the reset may not occur a specific period of time has elapsed such as, for example, 30 minutes has elapsed. During this period of time, the false error screen may continue to be displayed.

The cash handling device may be optionally configured to lock down and not allow any further transactions after a robbery.

In order to help facilitate an understanding of the inventions, sample graphical user interfaces are shown FIGS. 6-8.

Figure 6B:
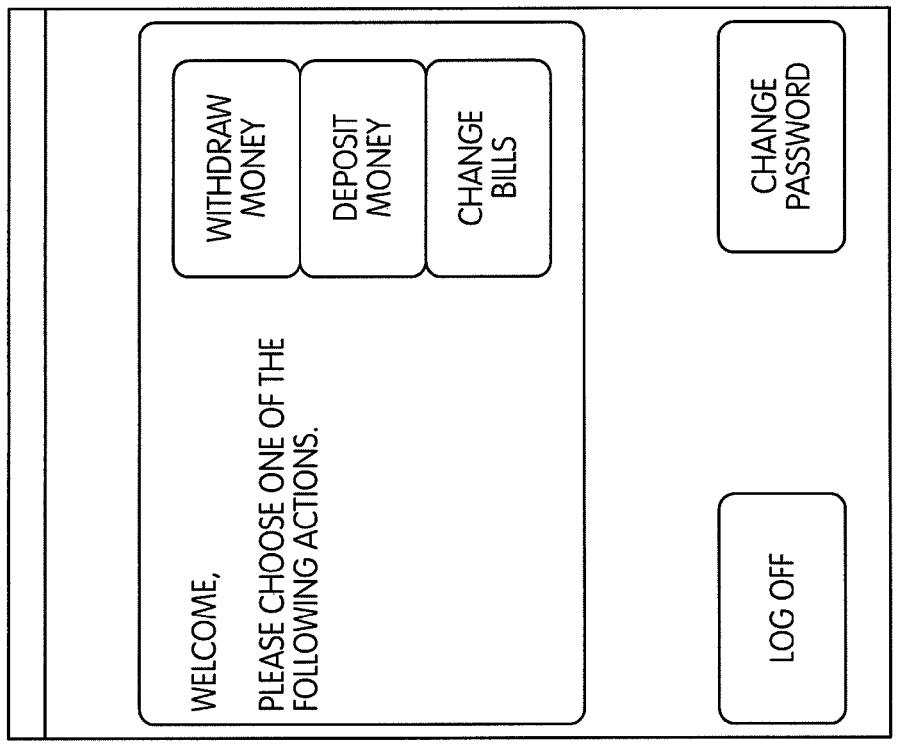
FIGS. 6A-D show sample graphical user interfaces displaying welcome prompts, options to withdraw currency, and options to login with a user ID and password or pin.
Figure 6A:
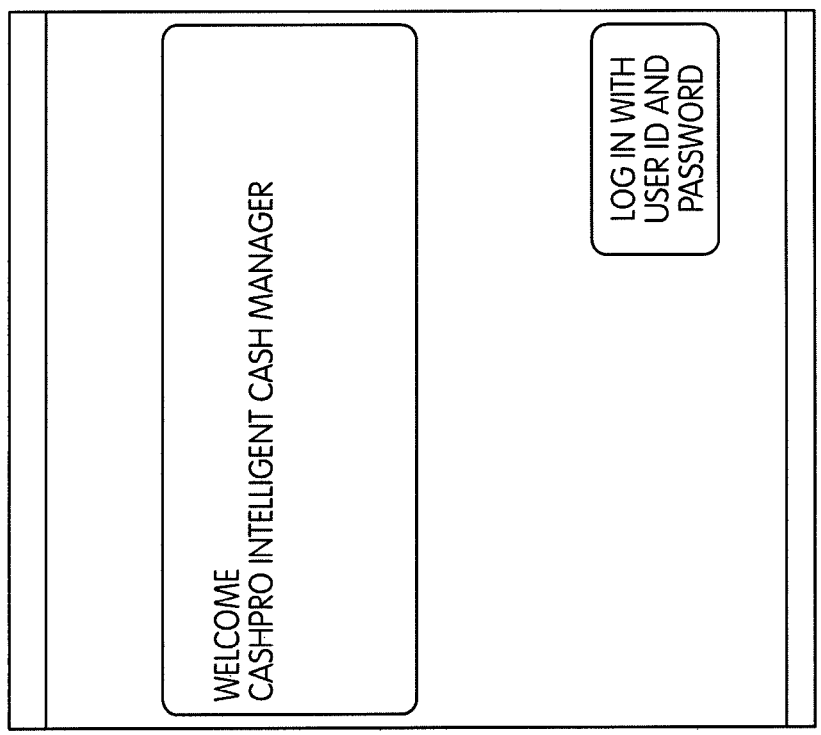
Figure 6D:
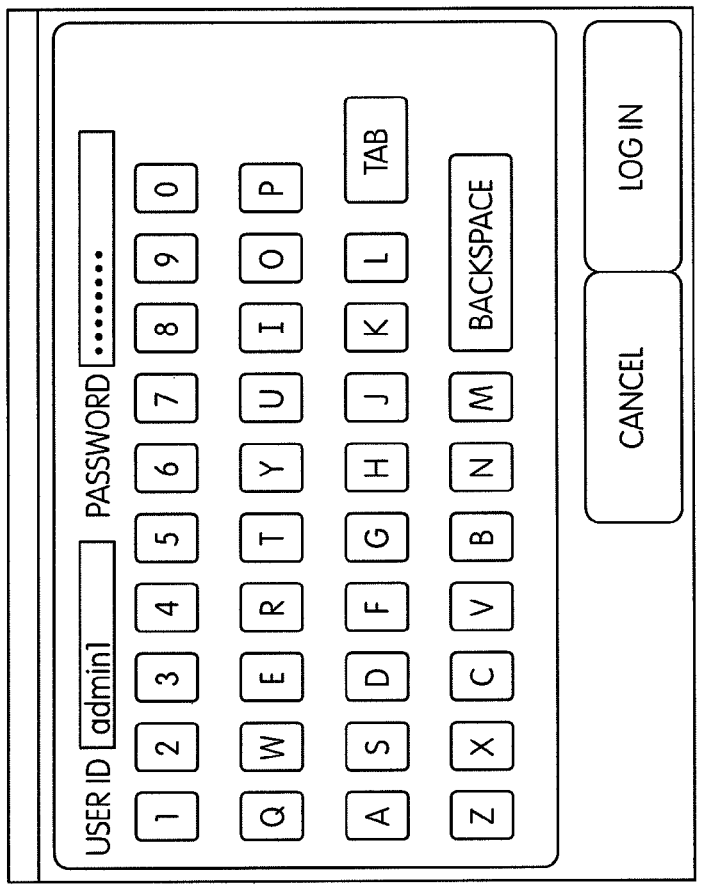
Figure 6C:
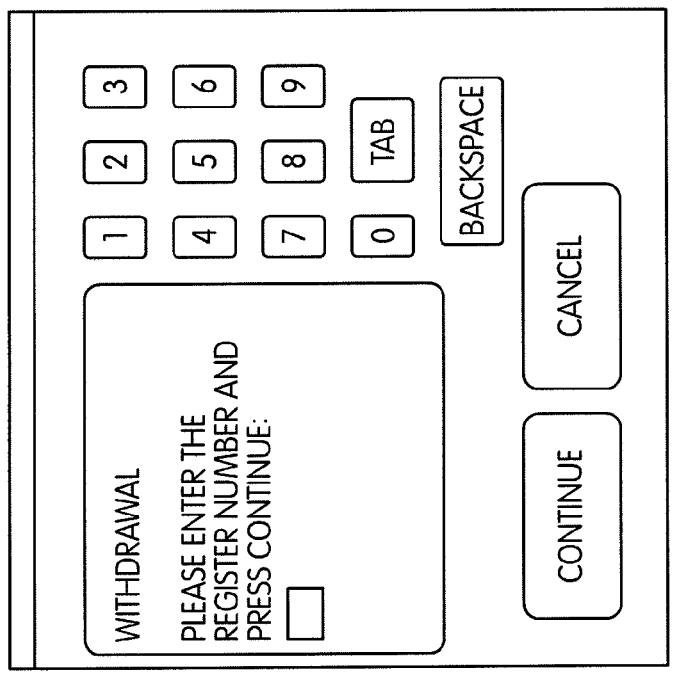

FIG. 6A shows a sample welcome prompt and option to login with a user ID and password. FIG. 6B provides an option to withdraw money. FIGS. 6C and 6D provide options to enter a withdrawal registration number or a username and password, any of which may be used to trigger a notification of a robbery attempt.

Figure 7B:
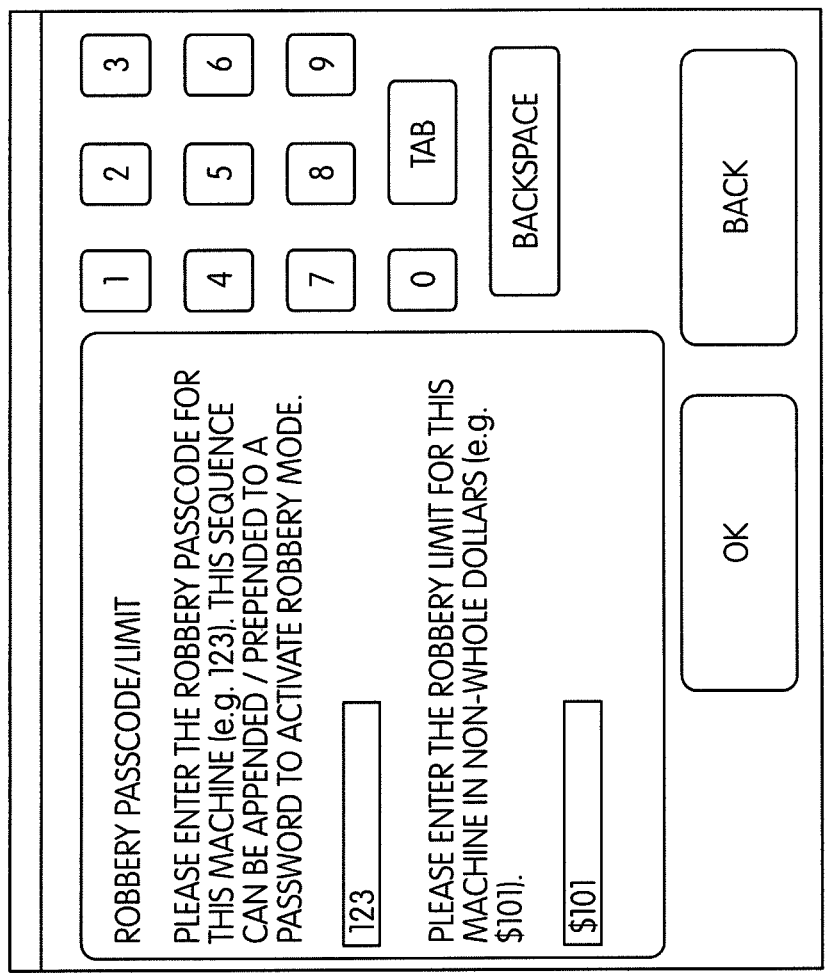

FIGS. 7A and 7B show sample graphical user interfaces allowing limits to be set by entitlement roll or as a robbery passcode limit. Any type of transaction limit, daily limit, or passcode limit may be used as the limit for a robbery. Further, different limits may be set for different situations, different types of transactions, or different users.

Figure 8B:
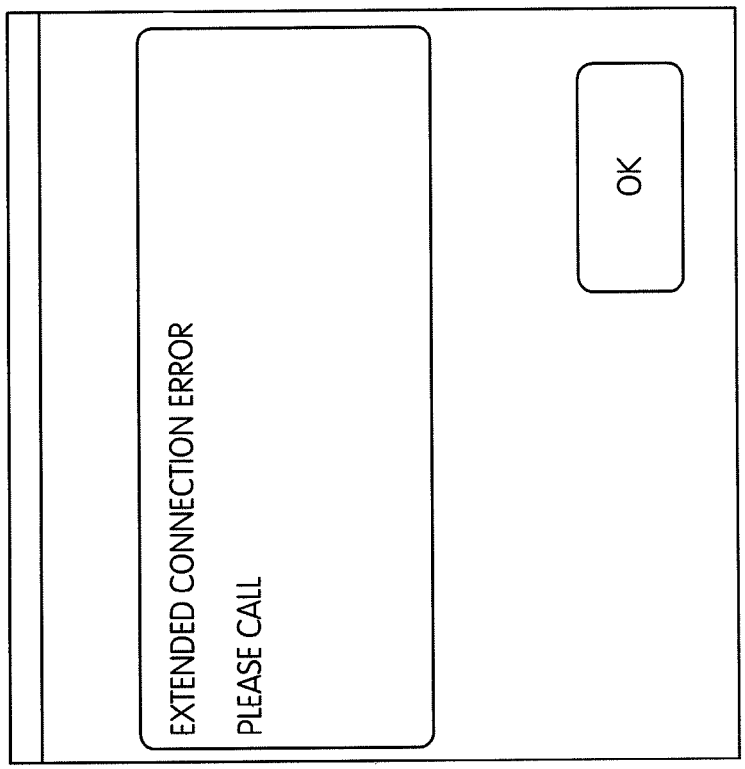
FIGS. 8A-8D show graphical user interfaces of sample error messages that may be displayed.
Figure 8A:
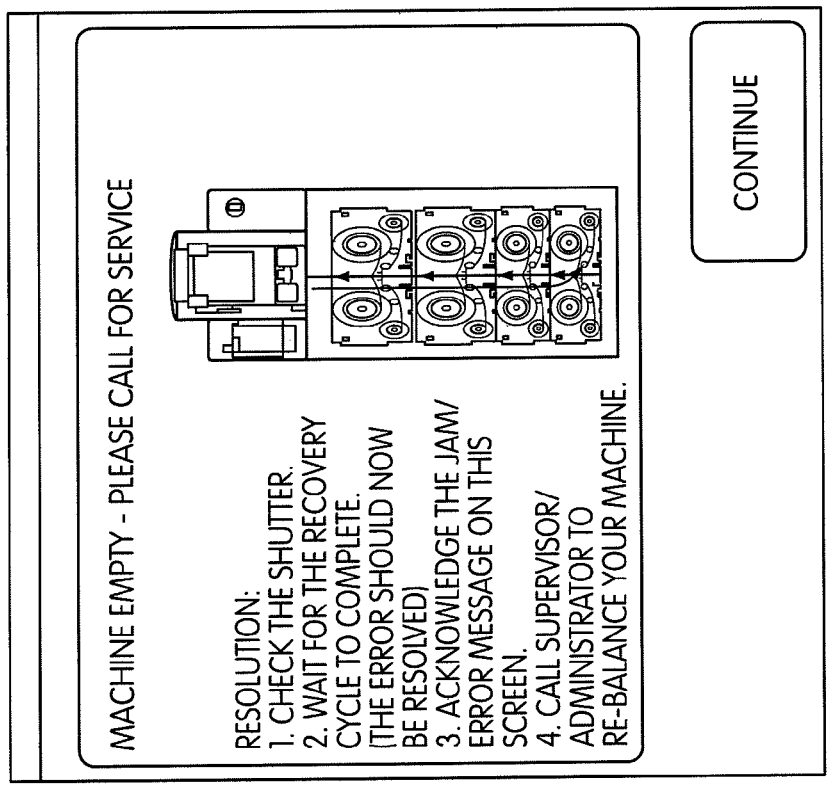
Figure 8D:
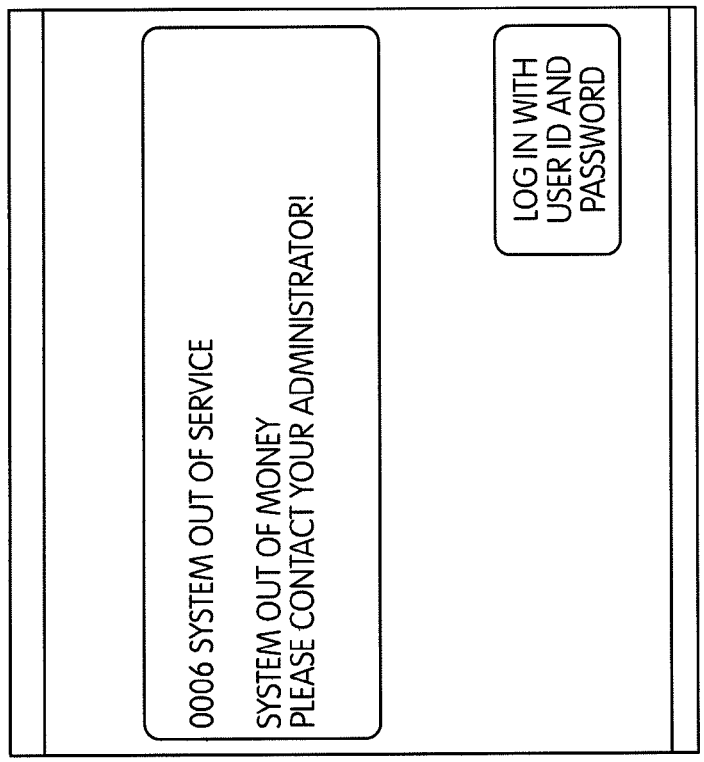
Figure 8C:
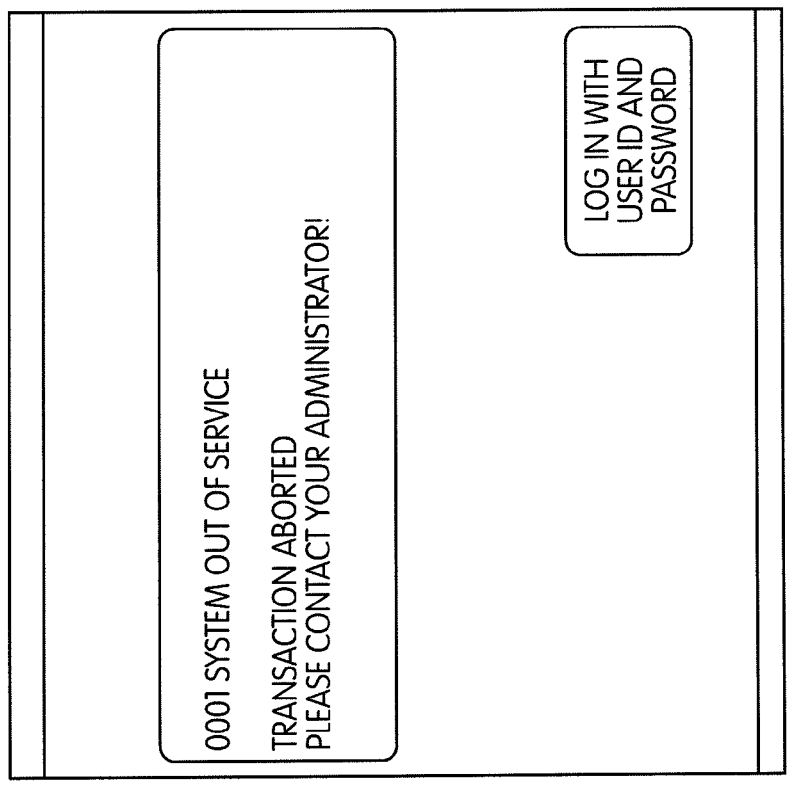

FIGS. 8A-8D show graphical user interfaces of sample error messages that may be displayed in the event of a robbery. FIG. 8A fakes a message that the recycler 200 is empty and instructs the user to call for service. FIG. 8B indicates that there is an extended connection error and instructs the user to call for service. FIG. 8C indicates that the system is out of service and that the transaction is aborted. FIG. 8D also indicates that the system is out of service and further states that the system is out of money.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:
   identifying a user;
   allowing the user to indicate a problem and allowing the user to enter a robbery passcode, wherein the robbery passcode is defined as one of the following: a separate code that is entered prior to identifying the user or after identifying the user; the robbery passcode is inserted into the middle of any type of user identification code, password, or personal identification number; the robbery passcode is triggered by pressing a certain portion of or an icon on a touch sensitive display;
   displaying a normal user interface to the user;
   allowing the user to request a withdrawal of money;
   determining whether the request is below a robbery limit, wherein the robbery limit is configurable and selectable, such that the robbery limit is defined from a set of two or more robbery limit options;
   dispensing the money to be withdrawn in response to detecting that the request is below the robbery limit;
   in response to detecting that the request exceeds the robbery limit, dispensing an amount of money equal to the robbery limit and displaying an error message that the requested funds are unavailable to fully satisfy the request; and
   providing at least one notification of the problem.

2. The method of claim 1 wherein the step of identifying the user includes allowing the user to enter a user identification.

3. The method of claim 1 wherein the step of identifying the user includes allowing the user's finger to be scanned.

4. The method of claim 1 wherein the set of robbery limit options includes two or more of the following: the robbery limit is defined based on a percentage of a value of total funds available, the robbery limit is defined based on a percentage of a value of total funds in a user's account, the robbery limit is defined based on a percentage of total funds in a recycler, the robbery limit is defined based on an amount specified by a financial institution, the robbery limit is defined based on a financial size of the user.

5. The method of claim 4 wherein the step of providing at least one notification of the problem includes sending an alarm code.

6. The method of claim 5 wherein the steps of the method are implemented as computer-executable instructions stored on a computer readable medium.

7. The method of claim 1 wherein the steps of the method are implemented as computer-executable instructions stored on a computer readable medium.

8. A method comprising:
   determining that a user who is attempting to withdraw money from a cash handling device is being robbed, wherein the user inputs a robbery passcode, wherein the robbery passcode is defined as one of the following: a separate code that is entered prior to identifying the user or after identifying the user; the robbery passcode is inserted into the middle of any type of user identification code, password, or personal identification number; the robbery passcode is triggered by pressing a certain portion of or an icon on a touch sensitive display;
   sending an alarm code providing a notification of the robbery;
   displaying a normal welcome screen to the user;
   allowing the user to request a withdrawal of money;
   allowing the user to identify an amount of money to be withdrawn;
   determining whether the amount of money to be withdrawn is less than a robbery limit, wherein the robbery limit is configurable and selectable, such that the robbery limit is defined from a set of two or more robbery limit options;
   dispensing the amount of money to be withdrawn to the user in response to detecting that the amount is less than the robbery limit; and
   in response to detecting that the amount of money to be withdrawn exceeds the robbery limit, dispensing an amount of money equal to the robbery limit and displaying an error message to the user indicating that the requested funds are unavailable to fully satisfy the request.

9. The method of claim 8 wherein the steps of the method are implemented as computer-executable instructions stored on a computer readable medium.

10. The method of claim 8 wherein the set of robbery limit options includes two or more of the following: the robbery limit is defined based on a percentage of a value of total funds available, the robbery limit is defined based on a percentage of a value of total funds in a user's account, the robbery limit is defined based on a percentage of total funds in a recycler, the robbery limit is defined based on an amount specified by a financial institution, the robbery limit is defined based on a financial size of the user.

11. An apparatus comprising:
    a processor for executing computer executable instructions;
    memory that stores the computer executable instructions;
    a communication interface;
    a display;
    an input means for receiving user input;
    wherein the computer executable instructions cause the apparatus to:
    allow entry of information through the input means for receiving user input in order to identify a user and to indicate that a robbery is in progress, wherein the input means to indicate that the robbery is in progress is a robbery passcode, wherein the robbery passcode is defined as one of the following: a separate code that is entered prior to identifying the user or after identifying the user; the robbery passcode is inserted into the middle of any type of user identification code, password, or personal identification number; the robbery passcode is triggered by pressing a certain portion of or an icon on a touch sensitive display;
    use the communication interface to provide notification of the robbery; show a normal welcome screen on the display; allow the user to request a withdrawal of money; allow the user to identify an amount of money to be withdrawn;
    determine whether the amount of money to be withdrawn is less than a robbery limit, wherein the robbery limit is configurable and selectable, such that the robbery limit is defined from a set of two or more robbery limit options that includes two or more of the following: the robbery limit is defined based on a percentage of a value of total funds available, the robbery limit is defined based on a percentage of a value of total funds in a user's account, the robbery limit is defined based on a percentage of total funds in a recycler, the robbery limit is defined based on an amount specified by a financial institution, the robbery limit is defined based on a financial size of the user;
    dispense the amount of money to be withdrawn to the user in response to detecting that the amount is less than the robbery limit; and
    in response to detecting that the amount of money to be withdrawn exceeds the robbery limit, dispense an amount of money equal to the robbery limit and show a message on the display to the user.

12. The method of claim 11 wherein the entry of information through the input means is a combination user identification code and robbery code.

13. The method of claim 12 wherein the message selected from the group consisting of: an error message, a notification that the amount of money to be withdrawn exceeds a daily withdrawal limit, and a notification that the requested funds are unavailable to satisfy the request.

* * * * *